(12) United States Patent
Weber

(10) Patent No.: US 7,818,461 B2
(45) Date of Patent: Oct. 19, 2010

(54) SYSTEMS AND METHODS FOR ALLOCATING AN ASSET TO INTERCONNECTED DEVICES

(75) Inventor: David M. Weber, Monument, CO (US)

(73) Assignee: LSI Corporation, Milpitas, CA (US)

(*) Notice: Subject to any disclaimer, the term of this patent is extended or adjusted under 35 U.S.C. 154(b) by 1069 days.

(21) Appl. No.: 10/424,408

(22) Filed: Apr. 28, 2003

(65) Prior Publication Data

US 2004/0215779 A1    Oct. 28, 2004

(51) Int. Cl.
*G06F 15/16* (2006.01)
*G06F 15/173* (2006.01)

(52) U.S. Cl. ...................... 709/251; 709/226

(58) Field of Classification Search .......... 709/226, 709/251; 370/403–406, 909
See application file for complete search history.

(56) References Cited

U.S. PATENT DOCUMENTS

| | | | |
|---|---|---|---|
| 5,553,073 A * | 9/1996 | Barraclough et al. | 370/455 |
| 5,560,022 A * | 9/1996 | Dunstan et al. | 713/300 |
| 6,625,709 B2 * | 9/2003 | Aiken et al. | 711/170 |
| 7,284,244 B1 * | 10/2007 | Sankaranarayan et al. | 718/104 |
| 2002/0013832 A1 * | 1/2002 | Hubbard | 709/220 |
| 2002/0018481 A1 * | 2/2002 | Mor et al. | 370/403 |

OTHER PUBLICATIONS

"Decentralized vs. Centralized Economic Coordination of Resource Allocation in Grids" by T. Eymann, M. Reinicke, O. Ardaiz, P. Artigas, L. Díaz de Cerio, F. Freitag, R. Messeguer, L. Navarro, D. Royo, 1st European Across Grids Conference Feb. 13-14, 2003.*

* cited by examiner

*Primary Examiner*—Nathan Flynn
*Assistant Examiner*—Chirag R Patel
(74) *Attorney, Agent, or Firm*—Duft Bornsen & Fishman, LLP

(57) ABSTRACT

Systems and methods for allocating assets to a plurality of devices are presented. In one embodiment, devices may be communicatively connected to one another through a device loop. Each device may be configured for determining a portion of an asset that it will use. A controller may also be communicatively connected to the communication medium and configured for determining a capacity of the asset. The controller may transfer control information to the devices so as to allocate the asset to the devices based on the capacity of that asset. In another embodiment, each of the devices may be communicatively connected directly to the controller rather than to one another.

9 Claims, 7 Drawing Sheets

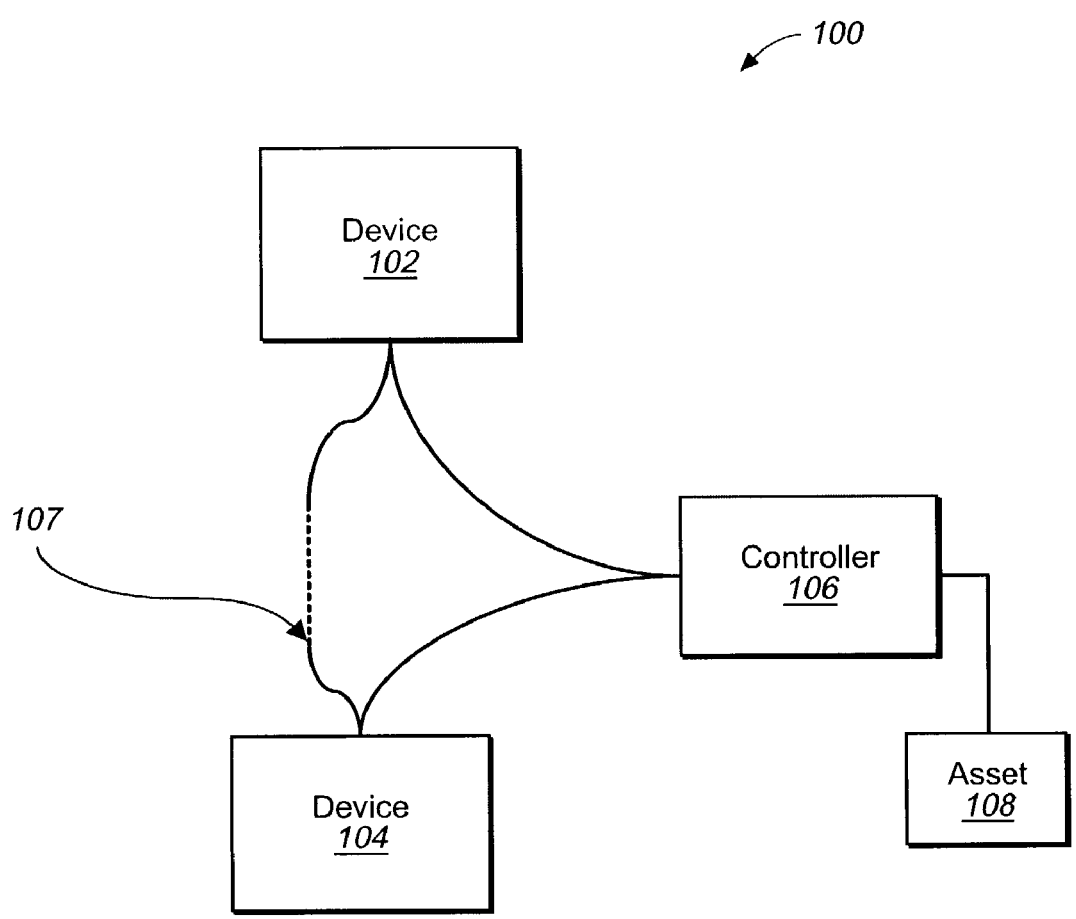
FIG._1

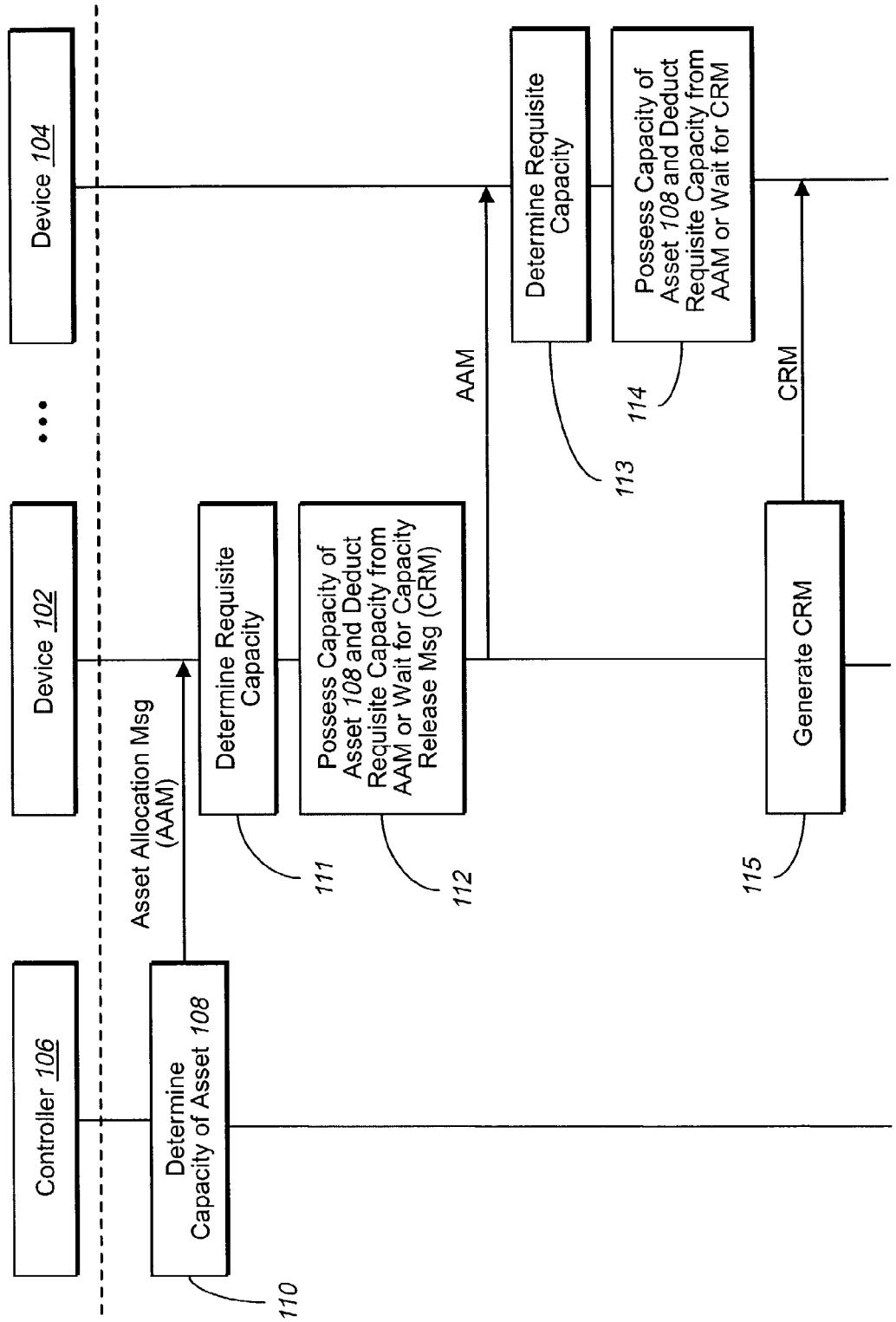
FIG._2

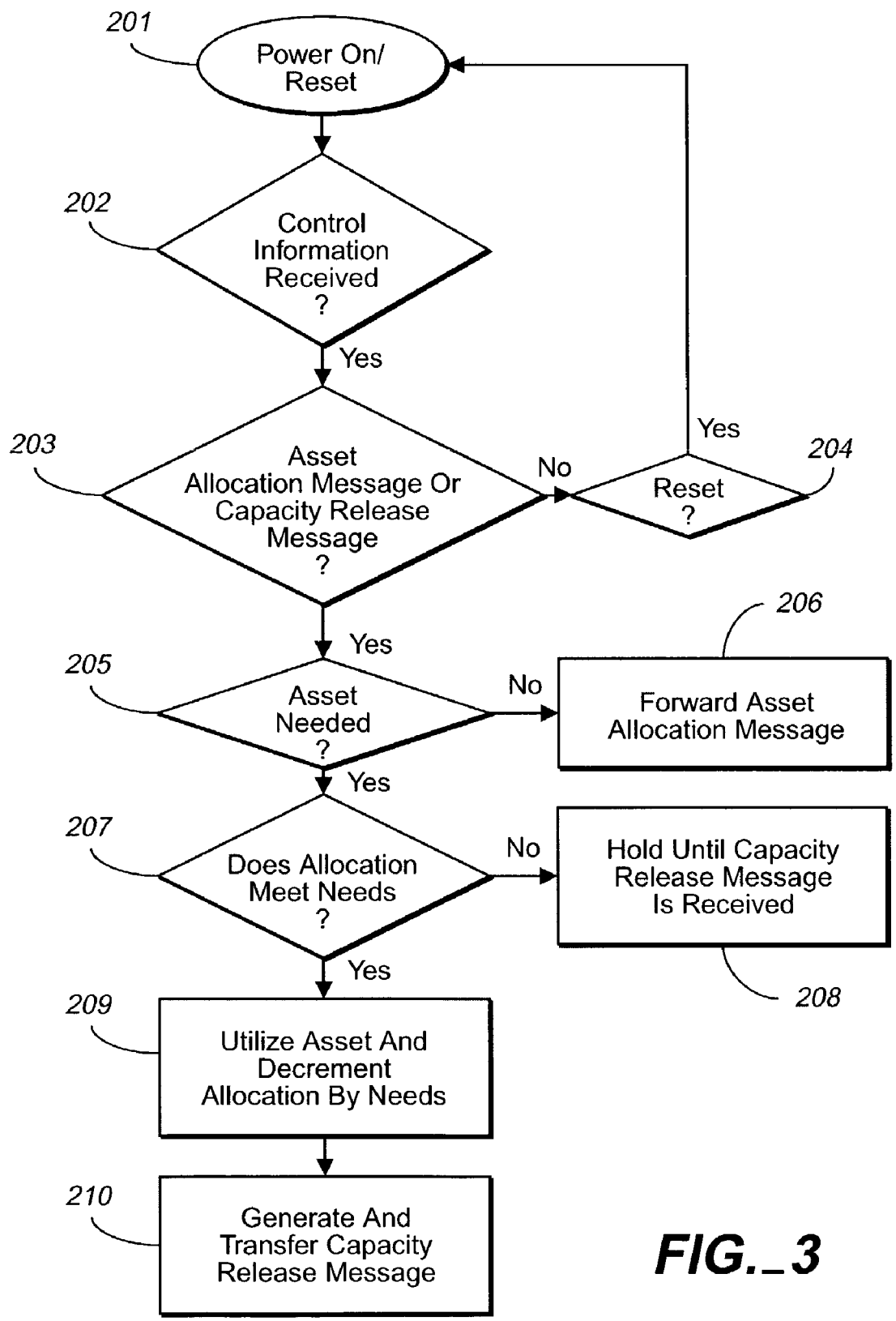
FIG._3

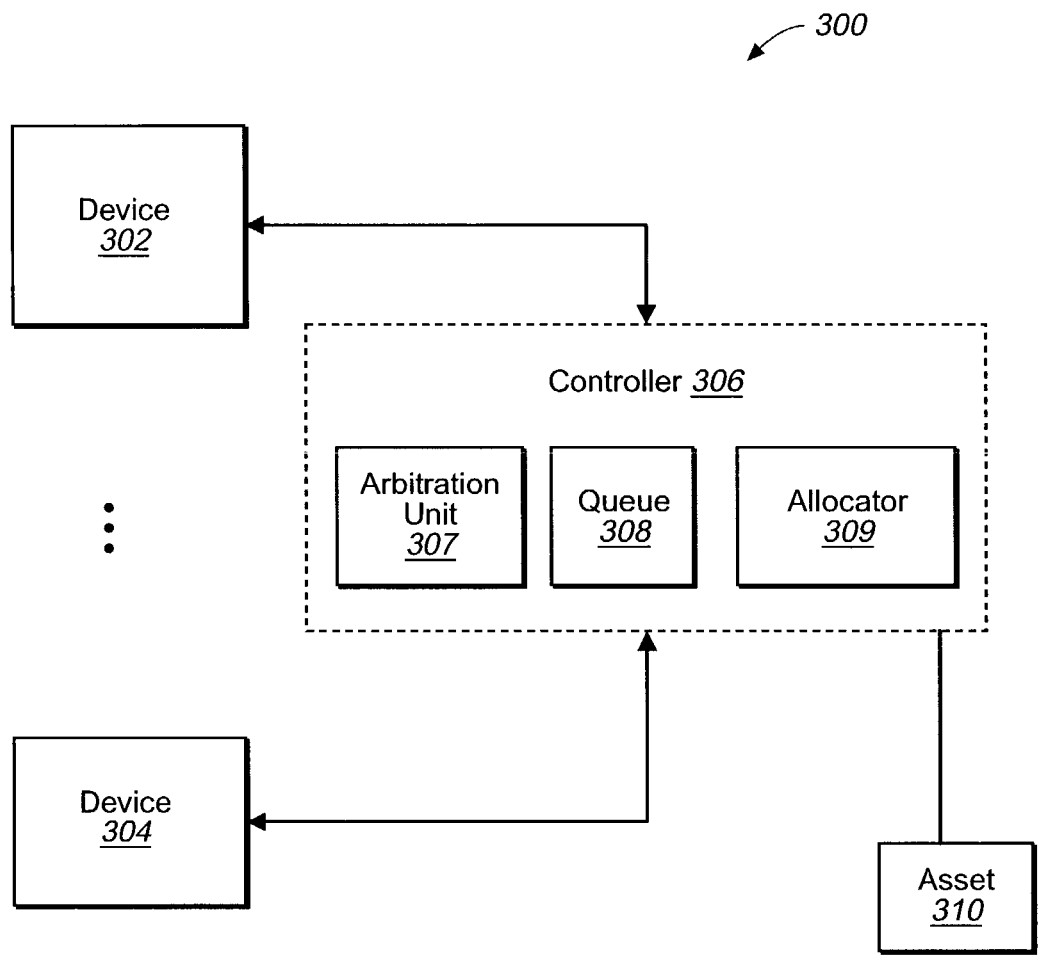
FIG._4

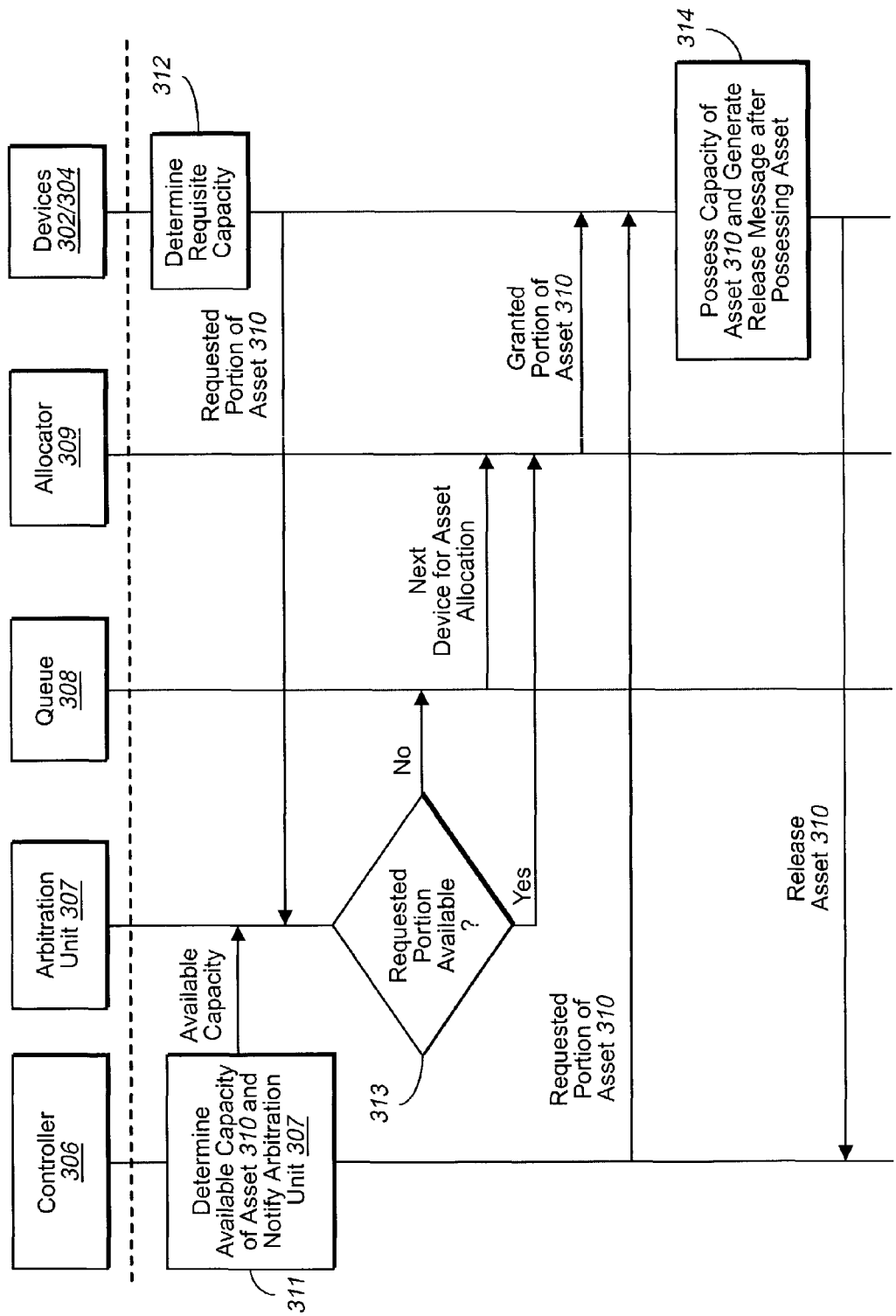
FIG._5

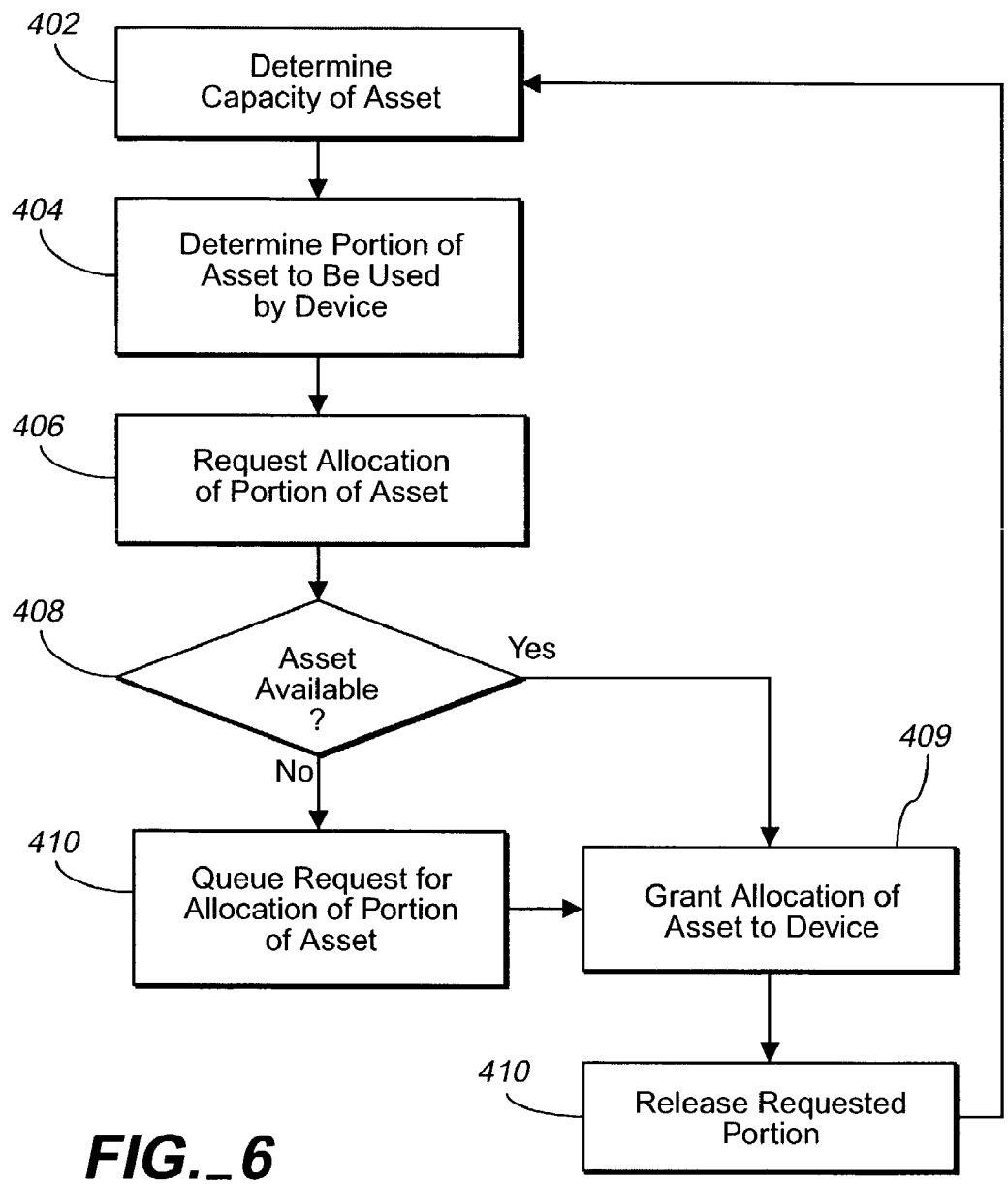
FIG._6

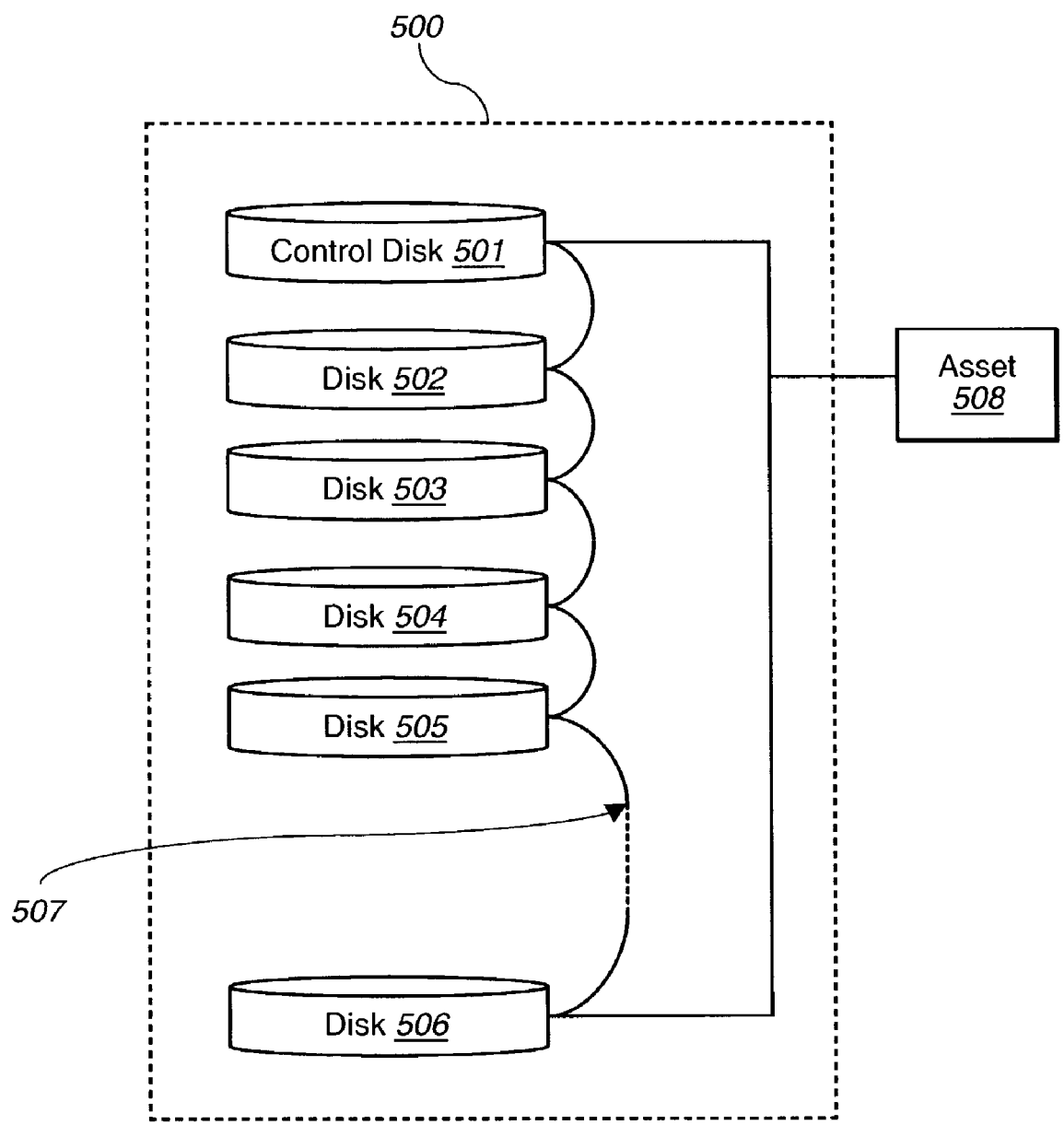
FIG._7

SYSTEMS AND METHODS FOR ALLOCATING AN ASSET TO INTERCONNECTED DEVICES

BACKGROUND OF THE INVENTION

1. Field of the Invention

The invention relates to allocation of assets to interconnected devices. More specifically, the invention relates to allocating a particular asset to devices of a storage system based on a capacity of the asset and a need for the asset by the devices.

2. Discussion of the Related Art

Systems often use a plurality of similar devices interconnected for performing desired functions. For example, a storage system can have a plurality of hard disk drives ("disks") connected to a communication medium for storing data. In such a storage system, a master device operably controls the disks according to a particular storage system design. Each device connected to the communication medium has access to one or more assets of the system. An example of one such asset includes power from a power supply configured within the system.

Devices connected to the communication medium utilize these assets according to their particular needs. At certain times, some devices require more of a certain asset than at other times. For example, during a power-on-reset of a storage system, disks of the storage system begin turning, or "spin-up", so that a host computer system may access data from the disks. During spin-up, disks require more current than they do to sustain spinning. However, as such a storage system powers on and resets, the combined current requirements of the disks spinning up often exceed a capacity that a power supply is capable of supplying. Thus, at certain times, devices require more of a particular asset than is presently available.

One solution to compensate for a lack of asset capacity within a system would be to simply increase the overall capacity of the asset. For example, a system could be configured to include a larger power supply to compensate for extra power that is required by devices during a power-on-reset or when many devices simultaneously spin-up. However, many devices do not persist in their demands for additional asset capacity. For example, as noted, once up to speed, rotating disk drives require less power. An implementation of the larger asset often results in useless and extraneous capacity during normal "steady-state" operation. Furthermore, as technology advances, it is often a design goal in many systems to decrease component size in order to accommodate flexibility in system design and in system use. Accordingly, increasing the physical size of an asset simply to increase the capacity contradicts goals of size minimization.

Another solution requires each device to timely operate with respect to the asset. For example, as a storage system is powered on, disks of the storage system spin-up in a timing sequence such that no combination of disk spin-ups exceeds the capacity of the power supply. However, timing each device of a system to utilize an asset often requires use of an intelligent controller to manage the timing. Such an intelligent controller would monitor each device to determine when a particular device operates in a mode that requires less of the asset. The intelligent controller, while useful in time management applications, increases the complexity of the system. Again, as design goals seek to simplify systems and hence shrink system sizes, the addition of an intelligent controller controverts those goals by increasing the complexity and size of the system.

It is evident from the above discussion that there is an ongoing need to provide improved system asset allocation to devices, particularly to those connected to a system communication medium, such as a device loop.

SUMMARY OF THE INVENTION

The present invention solves the above and other problems and advances the state of the useful arts by providing systems and methods for allocating system assets to interconnected devices. More specifically, the present invention assists in determining a capacity of an asset used by the devices and in allocating that asset to the devices based on the capacity of the asset.

In one exemplary preferred embodiment of the invention, devices may be communicatively connected to one another through a device loop. Each device may be configured for determining a portion of an asset that it will use. A controller may also be communicatively connected to the communication medium and configured for determining a capacity of the asset. The controller may transfer control information to the devices so as to allocate the asset to the devices based on the capacity of that asset. In another exemplary preferred embodiment, each of the devices may be communicatively connected directly to the controller rather than to one another.

In one aspect of the invention, a system includes: a device loop; a plurality of devices, wherein each device is communicatively connected to the device loop and configured for determining a portion of an asset to be used by the device; and a controller communicatively connected to the device loop and configured for determining a capacity of the asset and for transferring control information to said plurality of devices to allocate the asset among the devices.

In another aspect of the invention, the controller is integrally configured with one of the devices.

In another aspect of the invention, the control information comprises an asset allocation message used to allocate the asset to one of said plurality of devices.

In another aspect of the invention, each device is adapted to generate a capacity release message used to indicate available capacity of the asset and wherein each device is adapted to transfer the capacity release message to another of said plurality of devices upon use of the asset allocation message.

In another aspect of the invention, the asset is selected from a group consisting of power, current, voltage, time, and bandwidth.

In one aspect of the invention, a system includes: a plurality of devices, wherein each device is configured for determining a portion of an asset to be used by the device; and a controller communicatively connected to each device and configured for determining a capacity of the asset and for allocating the asset among the devices.

In another aspect of the invention, the plurality of devices comprises a plurality of storage disks and the controller comprises a queue configured for storing requests to begin spin-up operations from the storage disks when the capacity of the asset is not available.

In another aspect of the invention, the controller further comprises an arbitration unit configured for receiving the requests from the storage disks, for determining when the capacity of the asset is available, and for storing the requests in the queue when the capacity of the asset is not available.

In another aspect of the invention, the controller further comprises an allocator configured for accessing the queue to allocate the asset when the capacity of the asset is available.

In one aspect of the invention, a method for allocating an asset to a plurality of interconnected devices includes steps of: determining a capacity of the asset; determining a portion of the capacity of the asset to be used by a device of said plurality of interconnected devices; and transferring control information to said plurality of interconnected devices to allocate the asset among the devices.

In another aspect of the invention, the step of transferring comprises a step of configuring the control information with an asset allocation message used to allocate the asset to a first one of said plurality of interconnected devices.

In another aspect of the invention, the method further includes steps of: generating a capacity release message to indicate available capacity of the asset; and transferring the capacity release message from the first one of said plurality of interconnected devices to a second one of said plurality of interconnected devices upon use of the asset allocation message by the first one of said plurality of interconnected devices.

In one aspect of the invention, a method for allocating an asset to a plurality of devices includes steps of: determining a capacity of the asset; determining a portion of the asset to be used by one of said plurality of devices; requesting allocation of the portion of the asset; and allocating the asset to the one of said plurality of devices when the capacity of the asset is available.

In another aspect of the invention, the step of requesting comprises a step of requesting to begin spin-up operations from a storage disk.

In another aspect of the invention, the step of allocating comprises a step of determining whether the capacity of the asset is available.

In another aspect of the invention, the step of allocating further comprises a step of queuing requests from said plurality of devices upon determining that the capacity of the asset is not available.

BRIEF DESCRIPTION OF THE DRAWINGS

FIG. 1 shows a system with a plurality of devices connected to a device loop in one exemplary preferred embodiment of the invention.

FIG. 2 shows an operational diagram of the system of FIG. 1 in one exemplary preferred embodiment of the invention.

FIG. 3 shows a block diagram illustrating steps involved with asset allocation in one exemplary preferred embodiment of the invention.

FIG. 4 shows a system with a plurality of devices connected to a controller in one exemplary preferred embodiment of the invention.

FIG. 5 shows an operational diagram of the system of FIG. 4 in one exemplary preferred embodiment of the invention.

FIG. 6 shows a block diagram illustrating steps involved with asset allocation in one exemplary preferred embodiment of the invention.

FIG. 7 shows a storage system with a plurality of storage disks connected to a storage system device loop in one exemplary preferred embodiment of the invention.

DETAILED DESCRIPTION OF THE DRAWINGS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 includes controller 106 and a plurality of devices (e.g., device 102 and device 104) communicatively connected to device loop 107. Each of the devices uses an asset 108 of the system, such as power, current, voltage, time, and/or bandwidth. The devices may be similar devices or may be a heterogeneous mix of various types of devices. For example, system 100 could be a storage system with devices 102 and 104 being disks of that storage system.

System 100, through its associated components (e.g., controller 106 and devices 102 and 104), transfers control information via device loop 107 to allocate asset 108 among the components. Such control information may include an asset allocation message generated by controller 106 and capacity release messages generated by devices 102 and 104. The asset allocation message is transferred from controller 106 to device 102 and includes information regarding available capacity of asset 108. For example, after determining available capacity of asset 108, controller 106 may generate and transfer the asset allocation message to device 102. If the asset allocation message indicates an amount of available capacity that is greater than or equal to device 102's needs, then device 102 may decrement the amount by its needs and may transfer the message onto device 104. If, however, the asset allocation message does not indicate an amount that is greater than or equal to device 102's needs, device 102 may hold the message until it receives a capacity release message.

The capacity release message may be generated by a particular device when the device no longer needs the previously described amount of asset 108. The capacity release message may indicate that the device generating the message is essentially releasing its previously needed amount of asset 108. The particular device generating the capacity release message may transfer the message through device loop 107 to another device holding the asset allocation message. Once the other device receives the capacity release message, it updates, or increments, the available amount of asset 108 based on the capacity release message. Such an update may allow the other device to gain access or control of a portion of asset 108 when the combination of released units indicated by the capacity release message and units indicated by the asset allocation message meets or exceeds the needs of that device.

In one embodiment, the asset allocation message may be transferred from controller 106 to one of the devices connected to device loop 107 and sequentially transferred there along the loop to other devices by the devices themselves. Once a particular device receives the asset allocation message, that device determines whether asset 108 is needed. If asset 108 is needed, then the device allocates an amount of the asset as deemed necessary by the particular device. In another embodiment, each of devices 102 and 104, after holding the asset allocation message, may generate a capacity release message as the device determines there is no longer a need for the capacity.

In one embodiment, each of the devices is configured for determining a portion of asset 108 to be used. As an example, disks of a storage system may consume power (e.g., asset 108) as allocated through the storage system. Often, particularly during a power-on-reset of the storage system, the disks require more current to begin spinning (i.e., to "spin-up") than they do to sustain spinning. One or more power supplies configured within the storage system may allocate the current to the disks. In such a storage system, controller 106 may determine an initial available capacity of the power supply. The controller 106 may transfer control information (e.g., the asset allocation message) via device loop 107 to the disks to permit allocation of the available power among the disks.

While storage disks are presented as exemplary devices, it should be understood that devices 102 and 104 could be representative of other devices found within other systems. For example, multiple electronic devices could vie for bandwidth of a computer bus coupled thereto. Thus, the controller 106 would allocate asset 108 (e.g., the available bandwidth) to the devices in accordance with the methods described herein. Additionally, system 100 should not be limited to the number of devices shown. Rather, those skilled in the art will recognize that any number of devices may be communicatively coupled to allocate available capacity of a shared asset.

In one embodiment, controller 106 is configured with one of the devices. For example, controller 106 may be included in device 102 such that device 102 is considered to be the master device that generates and transfers the control information. Such a master device would maintain functionality of devices 102 and/or 104 as described herein; although, it would also include functionality of controller 106. An example of such an embodiment is described with more detail in FIG. 4.

FIG. 2 shows an operational diagram of system 100 of FIG. 1 in one exemplary preferred embodiment of the invention. Controller 106 determines a capacity of asset 108 in step 110. Controller 106 generates an asset allocation message and transfers that message to device 102. The asset allocation message indicates available capacity of asset 108. Device 102 receives the asset allocation message and determines its requisite capacity for asset 108 in step 111.

If the asset allocation message indicates sufficient available capacity of the asset to satisfy the needs of device 102, device 102 may allocate its requisite need from the allocation message and may forward the message with remaining available capacity to the next device 104 via loop 107. After allocating requisite capacity from the allocation message and forwarding the revised allocation message to a next device, device 102 may use its allocated portion of the asset as it requires. For example, where device 102 is a disk drive desiring power asset allocation to spin-up, it may start its spin-up processing. When device 102 has completed its usage of the allocated asset, it may generate a capacity release message and may forward the release message to the next device 104 connected to loop 107. The release message indicates the capacity of the asset previously allocated by device 102 is again available for allocation by other devices. Some device on loop 107 that presently possesses the allocation message and receives the release message will add the released capacity back to the available capacity indicated in the allocation message.

If the presently available capacity indicated in the allocation message is insufficient to meet the needs of device 102, device 102 may forward the message to the next device 104 via loop 107 or, alternatively, may retain possession of the allocation message awaiting restoration of available capacity previously allocated by other devices. The allocation message may be forwarded to the next device so that other devices that require capacity may utilize whatever available capacity exists at the time (though it may be insufficient for the present needs of device 102).

If device 102 chooses to retain possession of the allocation message (i.e., not forward it to the next device), then it awaits receipt of release messages from other devices releasing their previously allocated asset capacity. Receipt of each release message may cause device 102 to increment the available capacity in the allocation message. When the available capacity reaches the requisite capacity of device 102, device 102 may then allocate its requisite capacity and forward the modified allocation message with any remaining capacity to a next device on the loop.

Where device 102 is designed to forward the allocation message where the presently available asset capacity is insufficient to meet its needs, another device on the loop may be responsible for holding possession of the allocation message until release messages are received to increment the available capacity. For example, controller 106 may assume such a role. Alternatively, device 102 may monitor the allocation message as it proceeds around the loop and returns to device 102. Flags, counters or other status information may be recorded in the allocation message as it proceeds around the loop such that device 102 may decide that it must stop the message, retain possession of the allocation message and await receipt of sufficient release messages. Various design choices will be apparent to those skilled in the art to determine appropriate messaging protocols to assure eventual satisfaction of each outstanding requirement for asset allocation by any device on the loop.

Device 102 may transfer the asset allocation message to device 104 so that device 104 may take possession of asset 108. Similarly, device 104 may receive the asset allocation message and determine its requisite capacity of asset 108 in step 113. Once a determination is made, device 104 may take possession of asset 108 in an amount of its requisite capacity and may deduct the taken amount from the asset allocation message in step 114. If the asset allocation message does not constitute an allocation of asset 108 that meets device 104's requisite capacity, the device may wait for a capacity release message from another device connected to device loop 107.

Once device 102's requisite capacity decreases, the device generates a capacity release message and transfers the message to device 104 in step 115. Each of the devices connected to the loop may possess the functionality to generate such a capacity release message when the device's requisite capacity decreases.

FIG. 3 shows a block diagram illustrating steps involved with asset allocation in one exemplary preferred embodiment of the invention. In this embodiment, a system, such as system 100 of FIG. 1, is presented as beginning with a power-on-reset in step 201. In other embodiments, this step may be optional as asset allocation by the system may not depend on such a power-on-reset. A controller, such as controller 106 of FIG. 1, initiates communication by transferring control information to a device, such as device 102 of FIG. 1. The device determines if the control information is received in step 202. If the device receives the control information, the device determines whether the control information includes an asset allocation message in step 203. If the control information does not include an asset allocation message, the device determines if the control information includes a system reset message in step 204. If the control information does include a system reset message, the device, as well as the system, may perform a power-on-reset in step 201. Again, this step may be optional as some systems may not perform power-on-resets for asset allocation.

If the device determines that the control information includes an asset allocation message, the device determines whether it needs an asset, such as asset 108 of FIG. 1, in step 205. If the asset is not needed, the device forwards the asset allocation message to the next device (e.g., device 104 of FIG. 1) on the device loop in step 206. If, however, the device needs the asset, then the device determines if the available capacity indicated in the asset allocation message meets the present asset needs of the device in step 207. If the available capacity does not meet the present needs of the device, then the device may hold the allocation message until a capacity release message is received to increase the available capacity, e.g., step 208.

In another embodiment, although a device determines the presently available asset capacity is insufficient, the device may choose to forward the asset allocation message to the next device to permit other devices to use the available capacity. For example, if a particular device requires less capacity of the asset than another device requires, then the particular device may forward the capacity allocation message to the other device to more quickly begin operations of the other device.

When the presently available capacity of the asset meets the needs of a device, the device may take possession of and utilize the asset in an amount as required by the device and then decrement its requisite capacity for the asset from the amount available in the asset allocation message, in step 209. The device may then forward the updated allocation message to another device for additional asset allocations. After accessing the asset (e.g., using its requisite capacity for the asset) and transferring the asset allocation message, the device generates a capacity release message and transfers that message to the other device, in step 210. The capacity release message, in essence, grants to the other device an amount of capacity of the asset relinquished by the device originating capacity release message.

FIG. 4 shows system 300 with a plurality of devices (e.g., devices 302 and 304) each communicatively connected to controller 306, such as a "hub and spoke" communication with two or more devices individually connected to a central controller, in one exemplary preferred embodiment of the invention. Examples of such communicative connections include connections though communication switches and communication routers. In this embodiment, controller 306 allocates asset 310 to devices 302 and 304 based on a controller-determined availability of the asset. Devices 302 and 304 determine their respective requisite capacities for asset 310 and make requests to controller 306 for portions of the asset. Accordingly, controller 306 processes those requests and grants the portions of the asset to the requesting devices based on the availability of the asset.

Each of devices 302 and 304 is configured for determining a portion of an asset 310 to be used by a particular device. For example, each of devices 302 and 304 is configured to determine how much of asset 310 it will use. Accordingly, each of devices 302 and 304 may send a request to controller 306 requesting a portion of asset 310. Controller 306 may determine an available capacity of asset 310 and allocate the asset among devices 302 and 304. In a storage system embodiment, controller 306 may determine the capacity of a storage system power supply. Accordingly, controller 306 may allocate power from the power supply to storage disks (e.g., devices 302 and 304) through an asset allocation message. While this embodiment may be particularly useful in allocating power to storage disks within a storage system, it is not intended to be limited to the example described. For example, controller 306 may allocate other types of assets, such as current, voltage, time, and/or bandwidth, to other types of devices, such as electronic devices vying for bandwidth on a computer bus.

In one embodiment, controller 306 includes arbitration unit 307. Arbitration unit 307 is configured for receiving the requests from devices 302 and 304. Arbitration unit 307 is also configured for determining when the capacity of asset 310 is available and for storing the requests in queue 308 when the capacity of the asset is not available. For example, if devices 302 and 304 send requests to arbitration unit 307 to access asset 310, arbitration unit 307 will determine if the amount of the asset needed by devices 302 and 304 is available. If it is not, arbitration unit 307 stores the requests in queue 308 until asset 310 is available for use. For example, devices 302 and 304 make requests to arbitration unit 307 and arbitration unit 307 stores the requests in queue 308 based on a priority of the requests. That priority may be based on factors such as the amount of asset 310 needed by a particular device, a receipt order of the requests, and/or a prioritized need of the asset (e.g., device 302 has higher priority than device 304).

In another embodiment, controller 306 includes allocator 309. Allocator 309 is configured for accessing queue 308 to allocate asset 310 to devices 302 and 304 when the capacity of the asset is available. In a storage system embodiment, allocator 309 may access queue 308 and grant power from a power supply configured within the storage system to storage disks (e.g., devices 302 and 304). Such an allocation may be based on requests by devices 302 and 304 stored with queue 308. Allocator 309 may read the requests of devices 302 and 304 stored with queue 308 and allocate the available capacity of asset 310 to the device that made the request. Allocator 309 may also receive an indication from arbitration unit 307 to grant a portion of asset 310 as requested by a particular device. For example, if device 302 requests a portion of the asset 310 and that portion of asset 310 is available, then arbitration unit 307 may direct allocator 309 to grant that portion of asset 310 to device 302.

In the storage system embodiment, the disks may demand more power of a power supply as the storage system performs a power-on-reset or when many devices simultaneously spin-up. For example, during the power-on-reset, the disks generally require more power to begin spin-up operations than they do to maintain spinning. Controller 306 may, therefore, manage current allocation from the power supply such that the disks spin-up in a priority order of their requests.

FIG. 5 shows an operational diagram of system 300 of FIG. 4 in one exemplary preferred embodiment of the invention. Controller 306 determines a capacity of asset 310 in step 311. Once determined, controller 306 may indicate the available capacity of asset 310 to arbitration unit 307. Such an indication may be in the form of previously mentioned asset allocation messages.

Devices, such as devices 302 and 304, determine their requisite capacity of asset 310 in step 312. Once a determination is made, each device may request, from arbitration unit 307, a portion of asset 310 in an amount of its requisite capacity. Arbitration unit 307 may thus determine if the requested portion of asset 310 is available in step 313. If the capacity of asset 310 is available, arbitration unit 307 may indicate to allocator 309 that the capacity is available such that allocator 309 may grant the portion of the asset to the device requesting that portion. If the portion of the asset is not available, then arbitration unit 307 may store the request with queue 308 until the asset becomes available.

Allocator 309 may process requests of queue 308 and/or process requests directly from device(s) (e.g., device(s) 302 and/or 304) as determined by arbitration unit 307 when capacity is available. In doing so, allocator 309 may grant a requested portion of asset 310 to a particular device. Once granted, controller 306 may allow the particular device to access the requested portion of asset 310. The device then takes possession of its requisite capacity of asset 310 in step 314. Once that capacity is no longer required, the device may release asset 310 back to controller 306 by generating and transferring a capacity release message to the controller, freeing up that capacity so that another device may take possession of its requisite capacity.

FIG. 6 shows a block diagram illustrating steps involved with asset allocation in one exemplary preferred embodiment of the invention. In this embodiment, a system, such as system 300 of FIG. 4, is presented as beginning with a controller, such as controller 306 of FIG. 3, determining a capacity of an asset, such as asset 310 of FIG. 4, in step 402. Devices, such as devices 302 and 304 of FIG. 4, determine a portion of the asset to be used in step 404. Steps 402 and 404 may be interchangeable as each step is typically performed by a different device (e.g., the controller performs step 402 and individual devices perform step 404). Once the devices determine their requisite capacity, the devices may request from the controller a portion of the asset in step 406.

Upon receiving a request from a particular device, the controller may determine if the requested portion of the asset is available for use by the device in step 408. If the asset is available, the controller may grant allocation of the asset to the device in step 409. If the asset is not available, the controller may queue the request of the device in step 410. As the asset becomes available, the controller may process queued requests of the devices and grant allocation of the asset to the devices based on available capacity of the asset in step 409.

When a device no long requires its requested capacity of the asset, the device may release the capacity back to the controller in step 410. In doing so, the device may generate and transfer a capacity release message to the controller so that the controller may again determine the capacity of the asset (e.g., step 402).

FIG. 7 shows storage system 500 with a plurality of storage disks (e.g., disk 501 . . . 506) connected to a storage system device loop 507 in one exemplary preferred embodiment of the invention. In this embodiment, storage disk 501 is a control disk (or master disk) that, in addition to storing data, operates in accord with controller 106 of FIG. 1. Thus, control disk 501 may generate asset allocation messages and transfer those messages via storage system device loop 507. The asset allocation message may be similar to that described in FIG. 1 and, accordingly, system 500 may default to allocating an asset 508 to control disk 501 before allocation of the asset to any other disk (e.g., disks 502 . . . 506). For example, before disk 501 can determine a capacity of asset 508 and allocate that asset to the remaining disks, disk 501 may need the asset itself to perform such determinations and allocations.

Each of disks 501 . . . 506 is also configured for determining a portion of asset 508 to be used. For example, disk 502 can determine an amount of current it may need during a spin-up operation. This amount is typically more than an amount needed during routine operations (e.g., where the disk sustains spinning). Accordingly, disk 502 receives the asset allocation message from control disk 501 and uses the capacity of asset 508 as deemed available by the message. If the asset allocation message does not include enough capacity for disk 502, then disk 502 may hold the message until it receives a capacity release message from control disk 501 that increments the available units of asset 508. Once disk 502 obtains the needed amount of asset 508, it decrements the available capacity of asset 508 by the number of units needed and passes the asset allocation message on to disk 503.

In one embodiment, each of disks 501 . . . 506 is configured for generating a capacity release message and for transferring that message to the next disk on storage system device loop 507. The capacity release message indicates available capacity of asset 508 by incrementing the units of the asset allocation message as the asset becomes available. For example, once disk 502 has finished using asset 508, disk 502 may generate a capacity release message that increments the capacity such that, when processed by disk 503, the asset allocation message reflects the total available capacity of the asset. Disk 502 then transfers the capacity release message to disk 503 which, in turn, determines how much of asset 508 is to be used. The process continues similarly with remaining disks connected to storage system device loop 507.

In another embodiment, asset 508 may be directly coupled to device loop 507 and configured for allocating itself to disks 502 . . . 506. For example, asset 508 may be a power supply having a controller capable of determining power needs of disks 502 . . . 506 such that the asset 508 can allocate power to the disks according to the methods described herein.

Advantages of system 500 include an allocation of power that does not overload a power supply. Other advantages include a size minimization of a power supply configured with storage system 500 since supply of asset 508 to disks 502 . . . 506 is managed (e.g., disks 502 . . . 506 may consume less current from the power supply during routine spinning operations).

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed:

1. A system, comprising:
   a device loop;
   a plurality of devices, wherein each device is communicatively connected to the device loop and configured for determining a portion of an asset to be used by the device wherein the asset is shared by all of the plurality of devices; and
   a controller communicatively connected to the device loop and configured for determining a capacity of the asset and for transferring control information to said plurality of devices wherein the control information includes information representing presently available capacity of the asset,
   wherein the plurality of devices and the controller are coupled to the device loop such that each device is communicatively coupled to exactly two adjacent devices or is communicatively coupled to exactly one adjacent device and the controller,
   wherein the controller and the plurality of devices are adapted to receive the control information from a first adjacent device or from the controller and further adapted to transfer the control information to a next adjacent device or to the controller to allow each device to allocate its determined portion from the presently available capacity represented in the control information wherein the control information transferred to the next adjacent device or controller includes an updated presently available capacity reflecting any allocation performed by said each device.

2. The system of claim 1, wherein the controller is integrally configured with one of the devices.

3. The system of claim 1, wherein the control information comprises an asset allocation message used to allocate the asset to one of said plurality of devices.

4. The system of claim 3, wherein each device is adapted to generate a capacity release message used to indicate available capacity of the asset and wherein each device is adapted to transfer the capacity release message to another of said plurality of devices upon use of the asset allocation message.

5. The system of claim 1, wherein the asset is selected from a group consisting of power, current, voltage, time, and bandwidth.

6. A method for allocating an asset to a plurality of interconnected devices, comprising steps of:
- determining a presently available capacity of the asset wherein the asset is shared by all of the plurality of interconnected devices wherein a common controller coupled to the plurality of interconnected devices initially determines the presently available capacity of the asset;
- determining a portion of the capacity of the asset to be used by a device of said plurality of interconnected devices wherein each said device is operable to determine the portion of the asset to be used by said device independent of the common controller; and
- transferring control information including information representing presently available capacity of the asset to one or more of said plurality of interconnected devices to allocate the determined portion of the asset to the device wherein the control information transferred to the next adjacent device or controller includes an updated presently available capacity reflecting any allocation performed by said each device,
- wherein the plurality of interconnected devices and the common controller are coupled to a device loop such that each device is communicatively coupled to exactly two adjacent devices or communicatively coupled to exactly one adjacent device and the common controller,
- wherein the common controller and the plurality of devices are adapted to receive the control information from an adjacent device or from the controller, and
- wherein the step of transferring comprises transferring the control information to a next adjacent device or to the controller on the device loop to allow each device to allocate its determined portion from the presently available capacity represented in the control information.

7. The method of claim 6, wherein the step of transferring comprises a step of configuring the control information with an asset allocation message used to allocate the asset to a first one of said plurality of interconnected devices.

8. The method of claim 7, further comprising steps of:
- generating a capacity release message to indicate available capacity of the asset; and
- transferring the capacity release message from the first one of said plurality of interconnected devices to a second one of said plurality of interconnected devices upon use of the asset allocation message by the first one of said plurality of interconnected devices.

9. A system, comprising:
- a device loop;
- a plurality of devices, wherein each device is communicatively connected to the device loop and configured for determining a portion of an asset to be used by the device wherein the asset is shared by all of the plurality of devices; and
- a controller communicatively connected to the device loop and configured for determining a capacity of the asset and for transferring control information to said plurality of devices wherein the control information includes information representing presently available capacity of the asset,
- wherein the plurality of devices and the controller are coupled to the device loop such that each device is communicatively coupled to two adjacent devices or communicatively coupled to an adjacent device and the controller,
- wherein the controller and the plurality of devices are adapted to receive the control information from a first adjacent device or from the controller and further adapted to transfer the control information to a next adjacent device or to the controller to allow each device to allocate its determined portion from the presently available capacity represented in the control information,
- wherein the controller is adapted to initially generate an asset allocation message including the information representing the presently available capacity of the asset and the controller is further adapted to transfer the asset allocation message to an adjacent device,
- wherein each device is adapted to receive an asset allocation message,
- wherein each device is adapted to allocate its determined portion for allocation of the asset independent of the controller and is further adapted to modify the information representing presently available capacity of the asset to reduce it by the determined portion allocated to said each device,
- wherein each device is further adapted to determine whether its determined portion has been allocated and is further adapted responsive to the determination that its determined portion has been allocated to transfer the asset allocation message with the modified information representing presently available capacity of the asset to a next adjacent device or controller,
- wherein each device is further adapted to generate control information including a capacity release message indicating that the portion previously allocated by said each device that is no longer needed by the device, and
- wherein each device is further adapted to receive control information including a capacity release message and is further adapted to modify information representing presently available capacity of the asset in an asset allocation message.

* * * * *